United States Patent [19]

Ono et al.

[11] 4,202,766
[45] May 13, 1980

[54] PROCESS FOR REMOVING OIL PARTICLES FROM WASTE WATER CONTAINING THE SAME

[76] Inventors: Hiroshi Ono, No. 21-1, Asahi-cho, Fujisawa-shi, Kanagawa-ken; Toyoyasu Saida, No. 14-15, Kataseyama 3-chome, Fujisawa-shi, Kanagawa-ken; Kunimitsu Fukumura, No. 2070, Iijima-cho, Totsuka-ku, Yokohama-shi, Kanagawa-ken, all of Japan

[21] Appl. No.: 917,844

[22] Filed: Jun. 22, 1978

Related U.S. Application Data

[63] Continuation of Ser. No. 761,131, Jan. 21, 1977, abandoned, which is a continuation-in-part of Ser. No. 579,319, May 21, 1975, abandoned.

[30] Foreign Application Priority Data

May 27, 1974 [JP] Japan .................................. 49-58747
Sep. 27, 1974 [JP] Japan ................................ 49-110440

[51] Int. Cl.$^2$ .............................................. C02C 5/02
[52] U.S. Cl. ....................................... 210/40; 210/43; 210/51; 210/DIG. 26; 210/DIG. 27
[58] Field of Search .................... 210/28, 40, 43, 44, 210/47, 51-53, 59, DIG. 26, 73 W, DIG. 27; 252/330, 358

[56] References Cited

U.S. PATENT DOCUMENTS

| | | | |
|---|---|---|---|
| 3,147,216 | 9/1964 | Oemler | 210/40 |
| 3,347,786 | 10/1967 | Baer et al. | 210/44 |
| 3,674,683 | 7/1972 | Rainer | 210/40 |
| 3,703,464 | 11/1972 | Ferm | 210/40 |
| 3,739,913 | 6/1973 | Bogosian | 210/DIG. 26 |
| 3,756,948 | 9/1973 | Weinberg | 210/40 |
| 3,791,990 | 2/1974 | Fischer | 210/40 |
| 4,028,240 | 6/1977 | Manchak | 210/59 |

OTHER PUBLICATIONS

Haseltine, T. R. "Character and Treatment of Soluble Oil Wastes", *Sewage Works Journal,* vol. 21, No. 5, pp. 859-876, Sep. 1949.

*Primary Examiner*—Charles N. Hart
*Assistant Examiner*—Ivars Cintins

[57] ABSTRACT

A process for the separation of oil from waste water containing the same in the form of fine particles, comprising introducing a hydroxide or oxide of calcium or a mixture thereof into the waste water for adsorbing the oil on the hydroxide or oxide and/or coagulating the oil, adding an acid or an alkali to the waste water for dissolving the oil-adsorbing hydroxide or oxide to liberate the oil, and separating the liberated oil from the waste water.

2 Claims, No Drawings

PROCESS FOR REMOVING OIL PARTICLES FROM WASTE WATER CONTAINING THE SAME

This is a continuation of application Ser. No. 761,131 filed Jan. 21, 1977, now abandoned, which is a continuation-in-part of application Ser. No. 579,319 filed May 21, 1975, now abandoned.

BACKGROUND OF THE INVENTION

Field of the Invention

This invention relates to an improved process for the separation or removal of oil from waste water which contains the oil in the form of fine particles.

Description of the Prior Art

An oil which is dispersed in water in the form of fine particles particularly an oil which is converted into a stable emulsion by the action of an anionic surface active agent, is hard to separate by a conventional method using the specific gravity difference or a filtration or adsorption method. Conventionally, the dispersed oil is treated with a coagulation-separation method wherein aluminum sulfate, ferric chloride or equivalent compound is used as a coagulating agent. However, the coagulation-separation method presents the following difficulties. Firstly, a solid-liquid separating apparatus is required in order to separate the resultant scum. Conventionally, a pressure floating device has been used as the solid-liquid separating apparatus. This device, however, is of fairly complicated structure and costly, and requires a wide floor space. In addition, in order to operate stably with this device, meticulous care must be exercised in its maintenance. Secondly, since the scum separated by the above method usually contains 97 to 99% by weight of water, it is difficult to burn it off as such, and the scum must be dehydrated before the burning treatment. An Oliver filter, for example, is used for this purpose, but this device is as expensive as the pressure floating device and requires careful maintenance from the standpoint of the zig-zag movement, the clogging, and the washing of the filter cloth. Thirdly, the scum so dehydrated must be burnt off. This requires a large-sized equipment. Accordingly, there is a need for a method of coagulating oil alone without producing any scum.

Also exemplary of the prior art is a process disclosed in U.S. Pat. No. 3,347,786 Baer et al. which adds metal salts or metal oxides to the waste water and flocculates the same as their hydroxide by setting a suitable corresponding pH in the waste water and by repeated dissolvings and readjustments of the pH attempts to remove the emulsified oil. The salts added by Baer et al. are those of aluminum magnesium and iron. This process was not felt to be efficient enough and a search was therefore begun to achieve a process that gave better results.

SUMMARY OF THE INVENTION

It is therefore an object of the present invention to provide a process for separating from waste water an oil dispersed therein in the form of fine particles.

It is another object of the present invention to provide a process for separating from waste water an oil dispersed therein in the form of fine particles without formation of any scum.

It is a further object of the present invention to provide a process for separating fine oil particles from waste water in a simple and efficient manner.

Briefly stated, the process of the invention comprises introducing into the waste water or forming in situ therein at least one compound selected from the group consisting of hydroxides and oxides of calcium for adsorbing thereon and/or coagulating the oil particles contained therein; introducing an acid into the waste water for dissolving said compound thereby to permit the oil particles to be freed and/or converted into larger-size oil particles; and, finally, separating the liberated oil from the waste water.

The term "oil" herein used is intended to mean a mineral oil, an animal oil, a vegetable oil, and hydrocarbons such as toluene, ethylbenzene, stryene, and the like.

DETAILED DESCRIPTION OF THE INVENTION

The selected metal hydroxide(s) or oxide(s) may be directly added to the waste water in the form of powder or may be added in the form of a suspension obtained by dispersing the same in liquid.

The metal oxide or hydroxide is provided in the waste water in an amount of 5-200% by weight, preferably 10-100% by weight, of the oil contained therein and the concentration of the metal oxide or hydroxide in the waste water is preferably less than 5000 ppm, most preferably below 1000 ppm. It can then be observed that substantially all of the oil contained in the waste water is adsorbed on the surfaces of the oxide or hydroxide and/or coagulated by the action thereof. Then, the hydroxide or oxide existing in the waste water is dissolved by means of a dissolving agent, so that the adsorbed and/or coagulated oil is freed into large-size oil particles which are far greater in size than the fine oil particles existing prior to the treatment with the hydroxide or oxide. Upon the dissolution of the hydroxide or oxide, the waste water system should be agitated relatively carefully and slowly so as to prevent the coagulated and liberated oil from being redispersed into fine particles.

The dissolving agent may be any suitable acid. Examples of suitable acids are mineral acids such as sulfuric acid, hydrochloric acid, nitric acid, phosphoric acid and the like, and organic acids such as acetic acid. The acid is added to the waste water in such a manner that the pH of the water is kept in the range of 1-7, preferably in the range of 6-7.

The oil thus liberated is easily separated by permitting it to rise to the surface of the waste water by specific gravity difference. Upon separation, the oil particles having larger sizes can be removed almost directly, and in order to combine the relatively smaller size particles together, it is recommended to contact the oil particles with a metal surface such as that of a stainless steel fiber or of an oleophilic synthetic resin such as polyethylene, polypropylene or polyvinyl chloride. By oleophilic synthetic resin surface it should be understood surfaces of a resin plate or film, an inner surface of a resin tube or surfaces of small resin particles. The small particles of polyvinyl chloride are specifically suitable.

The waste water from which the large oil particles are removed still contains a small amount, usually a trace, of oil, which is then removed by an adsorption treatment using an oil collector. To this end, a filter is generally used made of an oleophilic synthetic resin fiber such as polyethylene, polypropylene or polystyrene. In this connection, it is preferable to mix the oleophilic synthetic resin fine fiber (hereinafter referred to simply as synthetic fiber) with a natural fibrous material (hereinafter referred to natural fiber) such as hemp, peat or coconut fiber. Though the fiber length of the synthetic and natural fibers is not critical, the average diameter of the former is generally below 100μ, preferably in the range of 1-30μ and that of the latter below 1000μ, preferably in the range of 10-500μ. The mixing ratio of the synthetic fiber to the natural fiber is generally in the range of 1:1-10 on the weight basis, but this is not critical.

The natural fibers are superior in hardness and elasticity to the synthetic fibers. When both fibers are mixed with each other by a suitable method, hard natural fibers are intertwined with one another in a manner as to define distinct spaces between the interwined fibers and soft synthetic fibers are thus entwined about the cores of the natural fiber lattices and extend into the spaces in the form of branches. Accordingly, the oil particles are collected by the branches of the soft synthetic fibers and subsequently, when accumulated to a certain extent, are forcedly moved toward the natural fiber lattices, thus making the mixed fiber very highly efficient for the removal of oils and very effective as a hard-to-clog filter material.

In the waste water from which the oil is separated there remains $Ca^{++}$ which is formed as a result of the dissolution of a corresponding hydroxide or oxide by the action of the acid. The ions may be separated and collected with a cation exchange resin, a chelate resin or the like, if required.

Though any waste water is treatable by the process of the present invention so long as it contains therein oil in the form of fine particles, the process of the invention is also very useful for the treatment of waste water which contains fine oil particles which are stabilized by an anionic surfactant. Though various anionic surface active agents are known in the art, typical are the alkali salts of organic sulfonic acids such as alkylsulfonates, alkylarylsulfonates and the like, and alkylphenolphosphates, sulfuric esters of higher alcohols, alkylsulfates, and the like. Also useful are salts of organic acids, including, for example, alkali salts of higher aliphatic acids and salts of naphthenic acid which exhibit surface active properties. The content of oil in waste water should preferably be below 5% by weight in order to have a satisfactorily suitable treatment.

With the present invention, therefore, a waste water which contains oil in the form of particles so small that it is difficult to separate them merely by gravity, may be treated in a simple manner without forming any scum. Since no scum is formed, the above-mentioned equipment for scum separation which is expensive and requires meticulous maintenance is no longer necessary. According to the process of this invention, the oil is liberated in the form of liquid, and only a simple liquid-liquid separating apparatus can fully separate it. Furthermore, both of the coalescing column and the oil adsorbing column are cheap because they are simple packed towers. As the oil is recovered in the form of liquid, it can be used as a fuel oil either as such or as a mixture with other oils. Moreover, the used oil adsorbent can be easily burnt off without the need to subject it to any particular dehydrating operation. The burning equipment can be far smaller in size than that for burning the scum, and the oil adsorbent may be exchanged only at long intervals. Furthermore, the process of the present invention is also very effective in separating from waste water fine oil particles which are stabilized by an anionic surface active agent and which are difficult to combine into larger-size particles by conventional methods.

The present invention will be particularly illustrated by way of the following examples, which should not be construed as limitative thereof.

EXAMPLE 1

50 g of calcium hydroxide were added to 20 l of compressor drain which contained 1,200 ppm of emulsified oil, and agitated for about 5 min. Then, hydrochloric acid was added to the drain with slow agitation for adjusting the pH to 7, so that the calcium hydroxide was dissolved and the oil adsorbed on the hydroxide was released again. When the thus treated drain was allowed to stand for about 10 min., all of the released oil floated on the surface on the drain, leaving an oil content in the water layer of 1.5 ppm.

EXAMPLE 2

Ca(OH), Al(OH)$_3$ and Mg(OH)$_2$ were respectively added in the same ratio of 0.3 g/l to a waste water containing 200 ppm of sodium dodecyl-benzene-sulfonate and 1200 ppm of oil emulsified by the same, the resulted mixture was stirred for a period of five minutes and the pH of the mixture was adjusted to a value shown in Table 1 and freed oil and solid, if any, were filtered to remove them. Analysis of the resultant oil in the waste water is tabulated in Table 1.

Table 1

| Metallic oxide or hydroxide added | Amount added (g/l) | pH | Oil content in the filtrate (ppm) |
| --- | --- | --- | --- |
| Ca(OH)$_2$ | 0.3 | 6 | 1.2 |
| Al(OH)$_3$ | 0.3 | 6 | 15.5 |
|  |  | 3 | 18.2 |
| Mg(OH)$_2$ | 0.3 | 6 | 28.0 |
|  |  | 5 | 30.5 |

In the case of Al(OH)$_3$ or Mg(OH)$_2$ was added to the waste water and pH was adjusted to 6 using aq. HCl, these hydroxides were not dissolved substantially or dissolved only partly and substantial parts of the oil remained in a state adsorbed to these hydroxides.

In case of using Al(OH)$_3$, it was completely dissolved by adjusting pH to 3. Similarly, Mg(OH)$_2$ was completely dissolved by adjusting pH to 5. In these cases, a part of oil freed by dissolving Al(OH)$_3$ or Mg(OH)$_2$ is redispersed in the waste water and oil content in the filtrate rather increased to some extent than in the case of adjusting pH to 6.

EXAMPLE 3

To water containing 800 ppm of sodium stearate was added 1000 ppm of Ca(OH)$_2$, Al(OH)$_3$ and Mg(OH)$_2$ respectively. After stirring the mixed water for periods of fifteen minutes and one hour, total organic carbons (TCC) of the filtrates obtained by filtering the solid content was measured. The result is tabulated in Table 2.

Table 2

| Additives | Amount added | TOC (ppm)* after 15 min. | TOC (ppm)* after 1 hr. | State of the Filtrate obtained after a stir of 1 hour |
| --- | --- | --- | --- | --- |
| none |  | 553 | 553 | palely turbid |
| Ca(OH)$_2$ | 1000 ppm | 15 | 15 | clear |
| Al(OH)$_3$ | 1000 ppm | 307 | 257 | palely turbid |

Table 2-continued

| Additives | Amount added | TOC (ppm)* after 15 min. | TOC (ppm)* after 1 hr. | State of the Filtrate obtained after a stir of 1 hour |
|---|---|---|---|---|
| Mg(OH)$_2$ | 1000 ppm | 172 | 132 | palely turbid |

*1 g of sodium stearate corresponds to 0.7048 g of TO and TOC is proportional to the concentration of sodium stearate, because no other organic material is included in the water.

As is apparent from Table 2, solid Ca hydroxide has higher ability to make the anionic surfactant inactive than that of solid Al or Mg hydroxide.

EXAMPLE 4

Waste water which was obtained by washing a product processed by a lather with sodium dodecylbenzenesulfonate-containing water and which contained 740 ppm of oil was treated with the metal oxides and hydroxides given in the Table in the amounts indicated while agitating for 10 min.

Hydrochloric acid was then added to each of the treated water samples for adjusting the pH to a predetermined value as indicated in the Table for dissolving the added metal oxide or hydroxide. The resultant water was allowed to stand for 10 min. to permit the oil to float on the water, and the thus floated oil was separated from the water. The remaining water was further passed into a column having a diameter of 36.5 mm and a height of 450 mm and packed with 45 g of the same kind of peat fiber an polypropylene fiber as used in Example 2. The oil concentration in water at the outlet of the column are shown in Table 3.

Table 3

| Metal Oxides or Hydroxides used | Amount (g/l) | PH Value upon Dissolution | Oil Content in Treated Water (ppm) |
|---|---|---|---|
| calcium hydroxide | 0.3 | 6 | 0.6 |
| calcium oxide | 0.3 | 6 | 0.9 |
| magnesium hydroxide | 0.5 | 5 | 1.8 |
| magnesium oxide | 0.5 | 5 | 1.6 |
| aluminum hydroxide | 0.3 | 3 | 1.2 |
| zinc oxide | 1.0 | 2 | 4.3 |
| ferric hydroxide | 0.5 | 2 | 1.5 |
| ferric oxide | 3.0 | 1 | 8.3 |
| titanium (III) hydroxide | 0.5 | 2 | 2.5 |
| titanium (III) oxide | 3.0 | 2 | 32.3 |
| nil | — | — | 680 |

EXAMPLE 5

Using the same conditions as in Example 2, CaO, Al$_2$O$_3$ and MgO were used as adsorbents and the pH of the solution was adjusted using aqueous hydrochloric acid. The results are shown in Table 4 below.

Table 4

| Metallic oxide added | Amount added (g/l) | pH | Oil content in the filtrate (ppm) |
|---|---|---|---|
| CaO | 0.3 | 6.8 | 1.4 |
|  |  | 6 | 1.4 |
| Al$_2$O$_3$ | 0.3 | 6 | 123 |
|  |  | 3 | 95 |
| MgO | 0.3 | 6.8 | 48.5 |
|  |  | 6 | 32.3 |
|  |  | 3 | 29.0 |

Al$_2$O$_3$ was not dissolved substantially and MgO dissolved only partly even with a pH of 3.

The use of CaO was similar to that of Ca(OH)$_2$ and the remaining oil content in case of using CaO was the same as that of using Ca(OH)$_2$ in the range of experimental errors.

EXAMPLE 6

Under conditions similar to those of Example 3, 1000 ppm of CaO, Al$_2$O$_3$ and MgO were added to water containing 800 ppm of sodium stearate. The results are tabulated in Table 5 below.

Table 5

| Additives | Amount added | TOC (ppm) after 15 min. | TOC (ppm) after 1 hr. | State of the filtrate |
|---|---|---|---|---|
| CaO | 1000 ppm | 18 | 14 | clear |
| Al$_2$O$_3$ | 1000 ppm | 386 | 245 | palely turbid |
| MgO | 1000 ppm | 255 | 121 | palely turbid |

As in the case of Example 5, the properties of CaO were substantially similar to those of Ca(OH)$_2$.

As a further result of the above examples, one can readily see how the use of calcium oxide and calcium hydroxide maximizes the efficiency of prior art processes such as that described by Baer et al. in U.S. Pat. No. 3,347,786 and provides a significant improvement over the salts and/or oxides disclosed in that patent.

The following explanations of the superior separating ability of CaO or Ca(OH)$_2$ which is shown in the experimental results of the separation of the anionically emulsified oil present in the water is offered. It is believed that part of the explanation resides in the solubilities of the respective oxides and hydroxides in water. These values are reproduced below:

| Compound | Solubility (g/100g water) |
|---|---|
| CaO | 0.131/10° C. |
| Ca(OH)$_2$ | 0.185/0° C. |
| Al$_2$O$_3$($\alpha$) | $9.8 \times 10^{-5}$/29° C. |
| Al(OH)$_3$ | $1.5 \times 10^{-4}$/20° C. |
| MgO | $8.6 \times 10^{-3}$/30° C. |
| Mg(OH)$_2$ | $8.4 \times 10^{-4}$/18° C. |

As is obvious from the above, the solubility of both CaO and Ca(OH)$_2$ is quite large as compared with that of the corresponding aluminum and magnesium compounds. It is believed that when CaO or Ca(OH)$_2$ is added to waste water containing an anionically emulsified oil, the oil is adsorbed on the CaO or Ca(OH)$_2$. Simultaneously, the CaO or Ca(OH)$_2$ is dissolved and reacts with the surfactant to convert it to an insoluble calcium salt. Thereby, the anionic surfactant in the waste water becomes inert and as a result, the oil emulsion is destroyed, facilitating adsorption of the oil to the CaO or Ca(OH)$_2$.

On the contrary, when using oxides or hydroxides of aluminum or magnesium, the solubility of these compounds is so small that a long period of time is required for the reaction with the anionic surfactant, and in the case of treating a waste water containing an anionically emulsified oil, a treatment for a longer period of time will be required than is needed to produce a similar effect when using CaO or Ca(OH)$_2$.

Another feature of the use of CaO or Ca(OH)$_2$ which is superior when compared with oxides or hydroxides of aluminum or magnesium is that the CaO and Ca- (OH)₂ have a higher pH when dissolved. This can be seen in Examples 2 and 4. Accordingly, the waste water having been treated, may be discharged without readjusting the pH.

What is claimed is:

1. A process for the separation of oil from waste water containing the said oil in the form of anionically emulsified and stabilized particles, which consists of introducing into said waste water a solid compound selected solely from the group consisting of calcium oxide and calcium hydroxide to adsorb thereon said oil, said solid compound being introduced in an amount of 5 to 200% by weight of said oil contained in said waste water; adding an acid selected from the group consisting of hydrochloric acid and nitric acid to said waste water to dissolve said compound, whereby the oil is freed in the form of large size particles, the pH of said waste water being in the range of 6 to 7 after the acid has been added; and separating said freed oil from said waste water.

2. The process according to claim 1, wherein said waste water is a drain discharges from a compressor and containing an emulsified oil, said selected solid compound is calcium hydroxide, and said acid is hydrochloric acid.

* * * * *